United States Patent
Vanka et al.

(10) Patent No.: US 10,108,449 B2
(45) Date of Patent: Oct. 23, 2018

(54) WORK ITEM MANAGEMENT AMONG WORKER THREADS OF A COMPUTING DEVICE

(71) Applicant: Qualcomm Innovation Center, Inc., San Diego, CA (US)

(72) Inventors: Krishna V. S. S. S. R. Vanka, Hyderabad (IN); Sravan Kumar Ambapuram, Hyderabad (IN); Krishna Gogineni, Hyderabad (IN); Murali Dhulipala, Rayakuduru (IN)

(73) Assignee: QUALCOMM Innovation Center, Inc., San Diego, CA (US)

( * ) Notice: Subject to any disclaimer, the term of this patent is extended or adjusted under 35 U.S.C. 154(b) by 148 days.

(21) Appl. No.: 15/263,557

(22) Filed: Sep. 13, 2016

(65) Prior Publication Data

US 2018/0074849 A1 Mar. 15, 2018

(51) Int. Cl.
G06F 9/46 (2006.01)
G06F 9/48 (2006.01)
G06F 9/50 (2006.01)

(52) U.S. Cl.
CPC .......... *G06F 9/4825* (2013.01); *G06F 9/4893* (2013.01); *G06F 9/505* (2013.01)

(58) Field of Classification Search
None
See application file for complete search history.

(56) References Cited

U.S. PATENT DOCUMENTS

| | | | |
|---|---|---|---|
| 8,612,986 B2 | 12/2013 | Accapadi et al. | |
| 8,990,821 B2 | 3/2015 | Blackburn et al. | |
| 9,529,644 B1* | 12/2016 | Verma | G06F 9/52 |
| 9,880,953 B2* | 1/2018 | Shajit | G06F 13/24 |
| 2010/0269110 A1* | 10/2010 | Leijen | G06F 9/505 718/100 |
| 2017/0024316 A1* | 1/2017 | Park | G06F 9/46 |

OTHER PUBLICATIONS

Cesati M., et al., "Work Queues", Understanding the Linux Kernel, 3rd Edition, Safari Books Online, 2018, 6 Pages.
Loginova V., "Multitasking in the Linux Kernel. Workqueues", Mar. 4, 2015, 1 Page, https://kukuruku.com/post/multitasking-in-the-linux-kernel-workqueues/.

* cited by examiner

*Primary Examiner* — Wissam Rashid
(74) *Attorney, Agent, or Firm* — Neugeboren O'Dowd PC

(57) ABSTRACT

Systems, methods, and apparatus are herein disclosed for performing load balancing of work queues via a dispatcher that shifts work items between worker threads. The dispatcher can be added to the kernel and can monitor work item workload histories to estimate the workload that each work item will add to a thread that it is scheduled for. Where a workload for a given processor is predicted to trigger performance scaling of that processor, the dispatcher can reschedule one or more work items from the scheduled or default work thread to another work thread. The another work thread can be selected such that the addition of the work item will not trigger performance scaling of the another work thread.

16 Claims, 7 Drawing Sheets

WORK ITEM MANAGEMENT AMONG WORKER THREADS OF A COMPUTING DEVICE

BACKGROUND

Field of the Disclosure

The present disclosure relates generally to Linux work queues, and more specifically to work queue load balancing.

Description of Related Art

Electronic devices controlled by processors may utilize interrupts to handle events, such as activities of peripherals. An interrupt typically causes the processor to save a current state of execution within the processor and begin execution of an interrupt handler to process the interrupt.

A peripheral attached to the processor may generate one or more of these interrupts to call for the attention of the processor. Interrupts allow the processor to respond to input, such as a user touch on a touch sensor.

SUMMARY

Embodiments disclosed herein address the above stated needs by analyzing a load on a worker thread, determining if the load exceeds a threshold that triggers performance scaling of a processor on which the worker thread is scheduled to execute on, and moving one or more deferrable work items from the worker thread to another worker thread. In identifying a worker thread to move the one or more deferrable work items to, the disclosed systems, methods, and apparatus can identify a worker thread with a light-enough load that moving one or more deferrable work items to the new worker thread will not cause performance scaling of the new worker thread.

In one aspect, an electronic device is disclosed for load balancing deferrable work items between worker threads at runtime. The device can include a plurality of processors, a scheduler, and a dispatcher. The plurality of processors can each be scheduled to execute a default worker thread. The scheduler can be executable on one or more of the plurality of processors to schedule a deferrable work item to execute on one of the default worker threads. The dispatcher can be executable on one or more of the plurality of processors to generate a predicted workload that the deferrable work item is likely to place on the one of the plurality of processors that the one of the default worker threads is scheduled to execute on based on a workload history of the deferrable work item. The dispatcher can also be executable on one or more of the plurality of processors to add the predicted workload for the deferrable work item to a workload on the one of the default worker threads for all other work items scheduled to execute on the one of the default worker threads, to form a total workload on the one of the default worker threads. If the total workload exceeds a threshold that would trigger performance scaling of the one of the plurality of processors that the one of the default worker threads is scheduled to execute on, then the dispatcher can be executable on one or more of the plurality of processors to move the deferrable work item to a second worker thread, the second worker thread running on a second of the plurality of processors.

Another aspect of the disclosure can be characterized as a method of load balancing deferrable work items between worker threads. The method can include receiving a request from a hardware device to process a deferrable work item, the hardware device coupled to a plurality of processors. The method can also include scheduling the deferrable work item to run on a default worker thread, the default worker thread running on a first of the plurality of processors. The method can yet further include retrieving a workload history for the deferrable work item and generating a predicted workload that the deferrable work item is likely to place on the first of the plurality of processors based on the workload history. The method can also include adding the predicted workload for the deferrable work item to a workload for all other work items scheduled to execute on the default worker thread to form a total workload on the default worker thread. Additionally, if the total workload on the default worker thread exceeds a performance scaling threshold, the method can include moving the deferrable work item to a second worker thread, the second worker thread running on a second of the plurality of processors.

Another aspect of the disclosure can be characterized as a non-transitory, tangible computer readable storage medium, encoded with processor readable instructions to perform a method for load balancing work items between worker threads at runtime. The method can include scheduling a deferrable work item to run on a default worker thread, the default worker thread running on a first of a plurality of processors. The method can also include retrieving a workload history for all work items scheduled to execute on the default worker thread. The method can yet further include adding the workload history for each of the work items scheduled to execute on the default worker thread to form a total workload on the default worker thread. If the total workload exceeds a performance scaling threshold for the first of the plurality of processors, the method can yet further include moving the deferrable work item to a second worker thread, the second worker thread running on a second of the plurality of processors.

Yet another aspect of the disclosure can be a system for load balancing work items between worker threads at runtime. The system can include a means to execute one default worker thread. The system can also include a means to schedule a deferrable work item to one of the default worker threads, the one of the default worker threads scheduled to execute on one of a plurality of processors. The method can yet further include a means for: retrieving a workload history for all work items scheduled to execute on the default worker thread; adding the workload history for each of the work items scheduled to execute on the default worker thread to form a total workload on the default worker thread; and if the total workload exceeds a performance scaling threshold for the first of the plurality of processors, then moving the deferrable work item to a second worker thread, the second worker thread running on a second of the plurality of processors.

DETAILED DESCRIPTION

Figure 1:
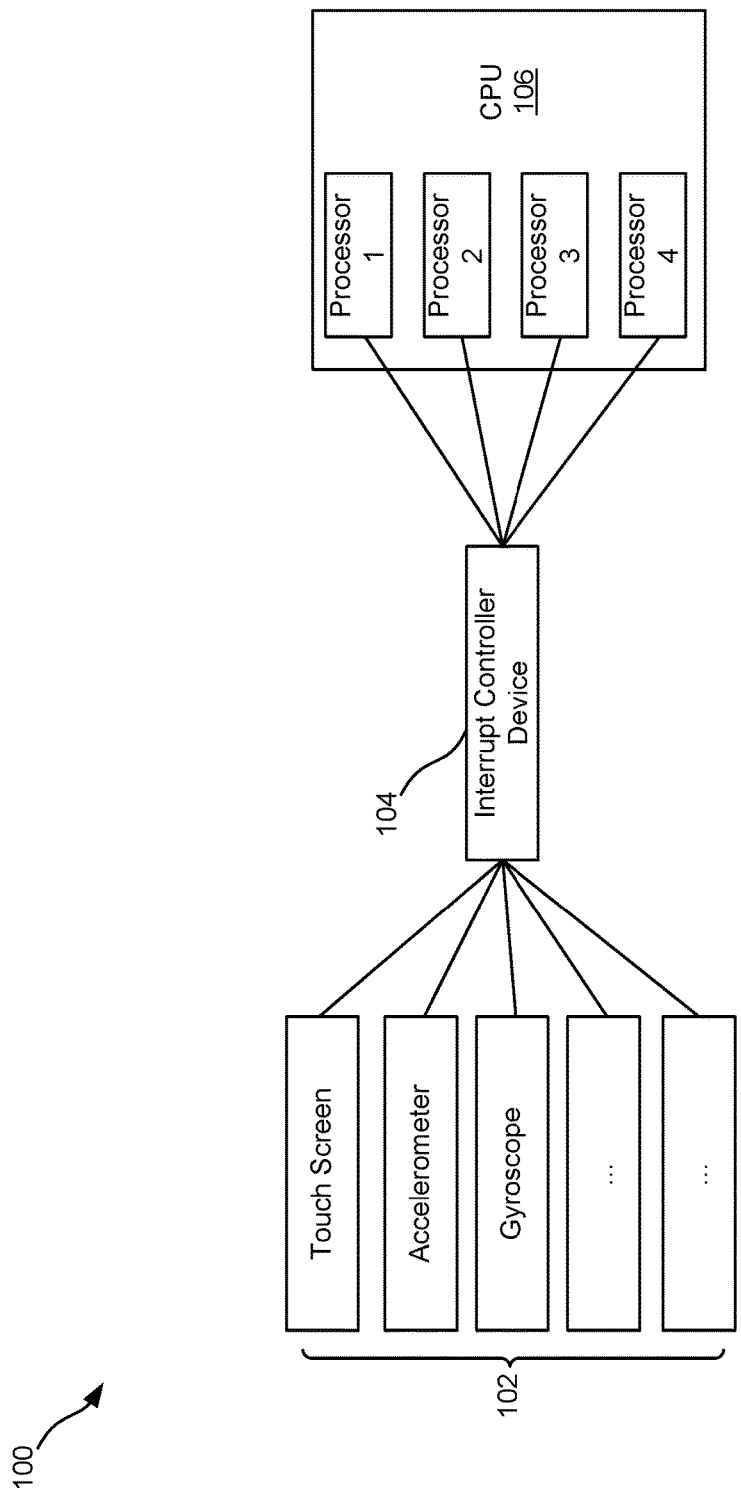
FIG. 1 is a typical hardware configuration for a system that handles deferrable work.

The term "work" or "work item" is used herein to mean a structure that describes a function that the system wishes to schedule for processing on the processor. Work is created at the driver level by hardware devices (e.g., a keyboard, printer, display), for instance, by an interrupt service routine (ISR).

A "worker thread" (also known as a "worker") is used herein to mean a kernel thread that processes work in a worker queue on one of a system's processors. Each worker thread is configured to carry out a different function. Worker threads can extract work from the work queue and activate one of a set of bottom-half handlers to address the work. A worker is controlled by the main Linux kernel scheduler and one or more workers can be assigned to each processor. Linux has default threads that developers can use, but developers can also create their own workers.

A "work queue" is used herein to mean a structure onto which work is placed that enables deferral of processor processing of the work until a later time. Work queues are one of three entities that can defer work, the other two being "softirq" and tasklets. However, work queues are the only deferral mechanism able to sleep or block. In this context, "sleep" and "block" mean to yield the processor to the kernel scheduler so that the kernel scheduler can schedule another worker thread while the current worker thread is waiting on a locked resourced to become available. A work queue typically contains a string of worker threads.

An "upper half" or "top half" is used herein to mean an interrupt handler, and handles the time-critical aspect(s) of an interrupt. It executes in an "interrupt context," meaning that the interrupt blocks other interrupts and processes from using the processor. The upper half interrupts processor processing, then releases the processor back to the process or code that was interrupted, and then schedules any remaining work (non-time-critical) to process in a bottom half at a later time.

The "bottom half" is used herein to mean an entity for performing deferrable work, or that work which remains to be processed after the upper half completes processing. In the latest versions of Linux, the bottom half includes softirq, tasklets, and work queues. The bottom half, or kernel context (or process context) allows for other interrupts, and thus long processing that is not time-sensitive can be carried out without blocking other interrupts or time-sensitive work. In other words, the processor can handle non-time-sensitive work while still being able to respond to other interrupts, thereby deferring the non-time-sensitive work until time-sensitive work has been processed. The top half, in comparison, does not allow for other processes to take control of the processor, and thus system latency can increase if processes remain in the upper half or interrupt context for too long. For this reason, there is a desire to pass off as much work to the bottom half as possible and minimize or reduce use of the upper half or interrupt context.

The "softirq" and "tasklets" are bottom half entities that can process deferred work, and are assigned a thread at compile time, and are therefore unable to switch threads at runtime.

An "interrupt service routine" (ISR) or "interrupt handler" is used herein to mean software that hardware invokes in response to an interrupt.

An "interrupt request" (IRQ) or "interrupt request line", is used herein to mean a hardware signal sent to the processor that causes the processor to pause processing of an existing process or code and turn to processing of the hardware event via an interrupt hander. Once the interrupt handler has completed its task, the IRQ returns control of the processor back to the interrupted process or code.

A processor typically runs in a "processor context" but then switches to an "interrupt context" when an interrupt occurs. This context switch involves the processor saving a state of the interrupted process or code, and then turning to process the event that caused the interrupt. Once the event has been processed, the processor can retrieve the state of the interrupted process or code and resume processing thereof.

A "workload" is used herein to mean an amount of processor resources used to complete a given task. Workload is also sometimes referred to as load, and is related to "runtime." Runtime is used herein to mean an amount of time that a processor will take to process a segment of data. The longer the runtime, the greater the workload on the processor.

A "kernel scheduler" or "Linux scheduler" is used herein to mean an entity that performs load balancing of threads between processors on the CPU. For instance, when a processor becomes heavily loaded, the kernel scheduler can move one or more threads from the heavily-loaded processor to a lightly-loaded processor. However, the kernel scheduler is unable to move work items between threads.

A "dispatcher" is used herein to mean an entity that schedules or moves work items between threads at runtime. In this manner, the dispatcher performs load balancing that the kernel scheduler is incapable of.

"Dynamic voltage scaling" or "dynamic clock and voltage scaling" (DCVS) is used herein to mean a mechanism for adjusting circuit voltage in order to conserve processor power. When processor loads fall below certain thresholds, DCVS can reduce a circuit's voltage, while processor loads above these or higher thresholds can cause increases in circuit voltage.

A "performance cluster" (or one or more "big cores") is used herein to mean one or more processors that handle high-load processing, but consumer more power than a "non-performance cluster" (or one or more "little cores"). Preferably, work is scheduled to little cores in order to conserve power.

The word "exemplary" is used herein to mean "serving as an example, instance, or illustration." Any embodiment described herein as "exemplary" is not necessarily to be construed as preferred or advantageous over other embodiments.

The phrase, "performance scaling" is used herein to mean any change in processor frequency or voltage, or a switch between a "little" and a "big" processor in a "Big-Little cluster" carried out to increase the performance that a thread is processed with. DCVS is one example of performance scaling.

Intro

Electronic devices with processors, such as cellular phones, portable media players, tablet computers, netbooks, laptops, personal computers, cash registers, electronic book ("eBook") readers, servers, medical devices, data acquisition devices, and so forth, may utilize interrupts for operation. An interrupt is an event external to the currently executing process that causes a change in the normal flow of instruction execution. Interrupts are usually caused by hardware devices external to the CPU (e.g., keyboard mouse, screen, disk drives, scanner, printer, sound card, camera, etc.). These external devices sometimes need to use the CPU, but the timing of such needs is often unpredictable. An interrupt typically causes the processor to interrupt a current processing task, save a current state of execution, and begin execution of an interrupt handler. For example, an interrupt may result from a user touching a touch sensor and generating data. This data may comprise position of a touch upon the touch sensor, magnitude of the touch, and so forth. The touch sensor generates an interrupt announcing to the processor that data is available and requires immediate action. The interrupt results in the suspension of a current task executing on the processor (thus "interrupting" the task) and execution of the interrupt handler.

Peripherals generate interrupts in many situations. For example, a touch sensor may send an interrupt when a buffer fills with touch data from the touch sensor. Some peripherals, such as touch sensors capable of accepting multiple touches, may send interrupts at a rate of 100 per second or more. As a result, the processor may receive an interrupt every 10 milliseconds (ms). The rate at which a touch sensor sends interrupt may be proportional to the frame rate of the sensor. For example, higher frame rates on the touch sensor may generate more frequent interrupts. Even if these interrupts occur in bursts, the processor remains busy. This in turn starves other applications of resources such as processor time because the processor is handling the interrupts rather than performing other work. This degrades overall system performance, while also preventing the processor and associated components, such as clocks, from entering power-saving modes. Thus, high interrupt rates slow down the performance of the electronic device and increase power consumption.

Another problem with interrupt handling is that lengthy tasks can bog down processing resources. Often a substantial amount of work is to be done in response to a device interrupt, but interrupt handlers need to finish up quickly and not keep interrupts blocked for long. These two needs (work and speed) conflict with each other, leaving the driver writer in a bit of a bind.

Linux (along with many other systems) resolves this problem by splitting the interrupt handler into two halves. The so-called top half (or fast handler) is the routine that actually responds to the interrupt—the one registered with request_irq. This handler is not interruptable and cannot be deferred. The top half addresses critical (e.g., updating data structures accessed by both the device and the CPU) and noncritical actions (e.g., updating data structures that are accessed only by the CPU). The bottom half (or slow handler) is a routine that is scheduled by the top half to be executed later, at a safer time. The bottom half addresses non-critical actions such as copying a buffer's contents into the address space of a process. Deferral is important since while an interrupt handler is running, signals on the corresponding IRQ line are temporarily ignored. Deferrable actions can be delayed for a long time without affecting the kernel operation since the interested process will merely continue waiting for the data. The big difference between the top-half handler and the bottom half is that all interrupts are enabled during execution of the bottom half—that is why it runs at a safer time. In the typical scenario, the top half saves device data to a device-specific buffer, schedules its bottom half, and exits: this operation is very fast. The bottom half then performs whatever other work is required, such as awakening processes, starting up another I/O operation, and so on. This setup permits the top half to service a new interrupt while the bottom half is still working. The Linux bottom half handlers (SoftIRQ, Tasklets, and work queues) were invented so that device drivers and other parts of the Linux kernel could queue work to be done later.

Almost every serious interrupt handler is split this way. For instance, when a network interface reports the arrival of a new packet, the handler needs to retrieve the data from the network card buffer and push it up to the protocol layer—this is the time-critical portion. If this does not happen immediately, then packets may be dropped. Later, the packet can be processed, thus this processing can be deferred and processed later via a bottom half.

Problem Statement

Work is typically queued for processing on a work queue. The work queue then provides the queued work to worker threads, where all worker threads typically operate on the processor on which they are scheduled to operate when code is compiled. In previous years, embedded systems (e.g., gyroscopes, cameras, temperature sensors) have been few enough in number and simple enough that queueing numerous work items on a single worker thread did not lead to performance hits. However, as the number and complexity of sensors and other devices that cause work has increased, some processors are seeing large-enough runtimes or workloads that dynamic voltage scaling or dynamic clock and voltage scaling (DCVS), frequency scaling, or shifts to performance clusters result (these can generally be referred to as "performance scaling"). These switches all constitute significant power drains that were not seen just a few years ago.

Having identified these power drains, the inventors sought to discover means to reduce this power consumption. At first, they asked developers to optimize or shrink the code that devices were calling. However, even after optimization, the interrupts were still leading to DCVS, frequency scaling, and shifts to performance clusters. The inventors then suggested that developers create distinct worker threads for their work, but this did not solve the problem since even new worker threads get stacked onto the same processor thus causing the same workload as before the new worker threads were added.

The inventors then recognized that work queues can move work items between worker threads at runtime, not just before compiling, and thus, by monitoring predicated runtimes or workloads for a given worker thread, work items could be moved between worker threads in order to load balance work items between a plurality of processors. In other words, work items can be shifted between worker threads at runtime in order to prevent any processors from seeing performance scaling.

Load balancing is performed in the art by means of the kernel scheduler, which can shift entire worker threads between processors when a processor becomes heavily-loaded (see for example U.S. Pat. No. 8,612,986). However, often it is individual worker threads that overload a processor rather than the cumulative effect of multiple worker threads that cause performance scaling of a processor. Therefore, even when a heavy worker thread is moved to another processor, the worker thread may then overload this new processor and thus the move, or attempt at load balancing, accomplishes very little if anything. This is another aspect of the challenge that the inventors recognized—that existing load balancing (moving threads between processors) does not solve the stated problem. Instead, they realized that what was needed was a way to shift work items between worker threads, and thereby reduce a load caused by a single heavy worker thread.

Figure 2:
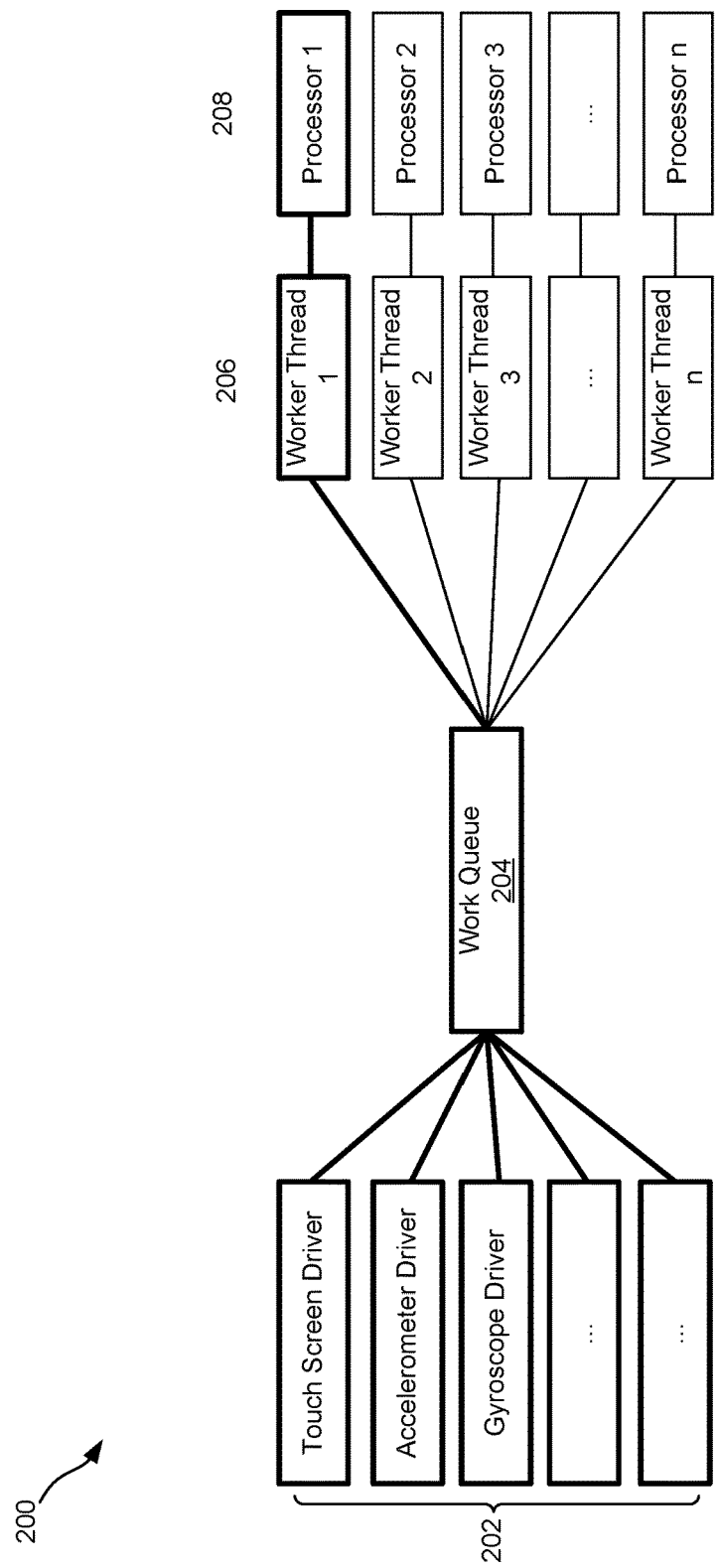
FIG. 2 is a higher level view in the "stack" of the system shown in FIG. 1.

FIGS. 1 and 2 illustrate the above-noted challenges in load balancing. Typically hardware devices 102, such as a touchscreen, an accelerometer, a gyroscope, and other such devices, provide interrupts to an interrupt controller device 104. The interrupt controller device 104 can analyze the interrupts and determine to which of a plurality of processors in a CPU 106 each interrupt should be directed to, and in what order. The processors can then process the interrupts, addressing immediate needs of each interrupt in a top half and then addressing deferrable work in a bottom half, such as via work queues, tasklets, and SoftIRQ.

The interrupt controller device 104 receives interrupts from various hardware devices 102, groups them, and then signals the CPU 106 that one or more interrupts need attention. Interrupts can be assigned priorities in case multiple interrupts arrive at the interrupt controller device 104 at the same time.

FIG. 2 shows a view of FIG. 1 from higher in the "stack." Hardware devices 202 generate interrupts, and then an interrupt service routine (ISR) or another schedules deferrable portions of the interrupt (i.e., work items) to a work queue 204. The work queue 204 schedules each work item to one of the plurality of worker threads 206, where at least one worker thread is processed on each of multiple processors 208 in a CPU. The work queue 204 schedules the work items to worker threads without considering a predicted workload or runtime that the work items will place on the associated processor 208. Multiple worker threads can be scheduled per processor 208. In some cases, the workload or runtime associated with a processor 208 will exceed a threshold that would trigger performance scaling, and thus a kernel scheduler can move worker threads between processors 208 to try and prevent performance scaling of any processor 208. However, sometimes a single worker thread has such a large workload that whatever processor this heavily-loaded worker thread is moved to will see performance scaling. Thus, the kernel scheduler known in the art does always not prevent performance scaling.

Solution

This disclosure describes a dispatcher that is added to the kernel, where the dispatcher monitors a history of work items along with workloads on worker threads and then schedules, moves, or distributes work items between threads at runtime in order to perform load balancing and prevent any new work item from triggering performance scaling of its respective processor.

Figure 3:
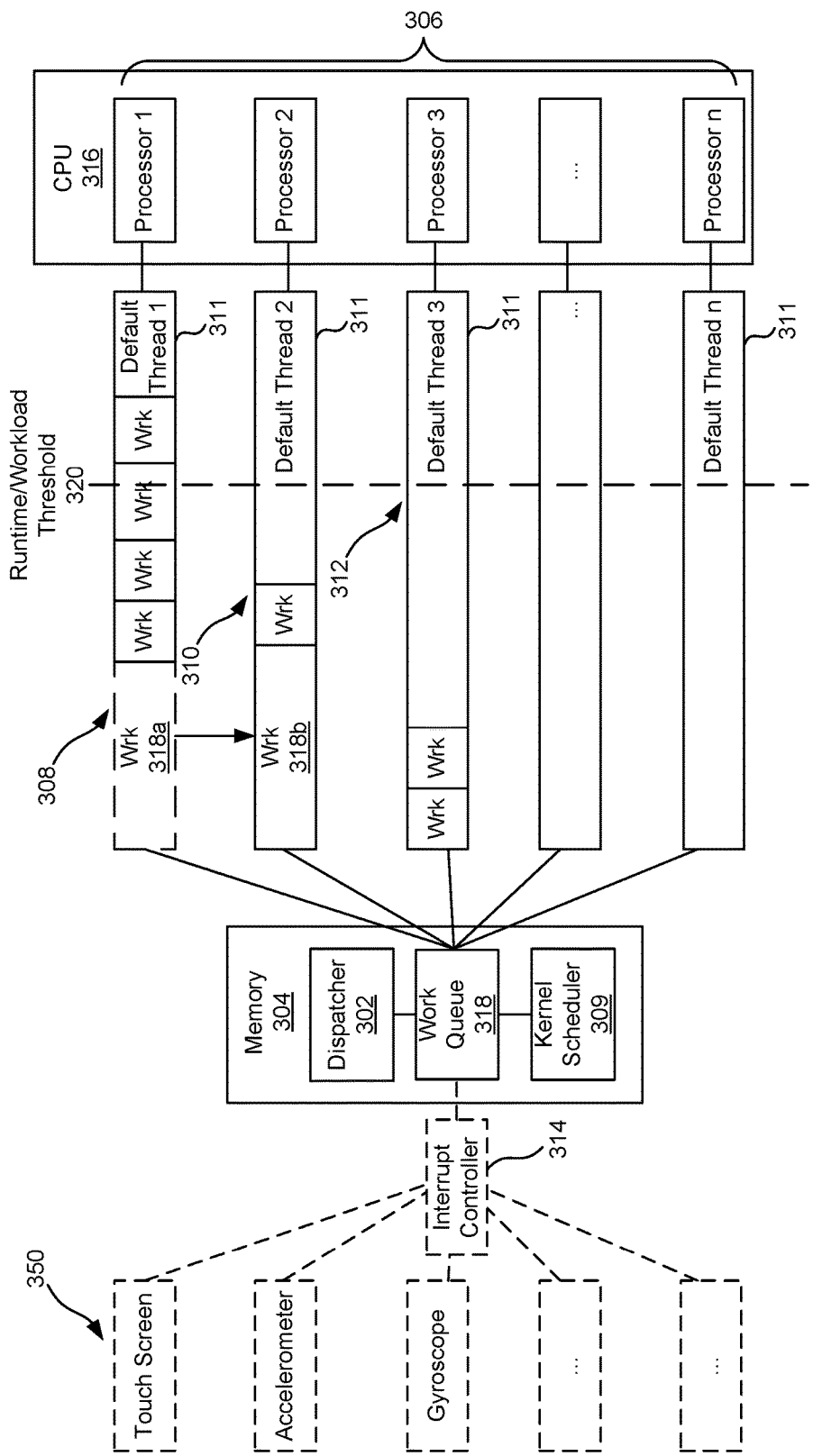
FIG. 3 is an illustrative diagram of a system configured to perform load balancing of deferrable work items between worker threads at runtime.

FIG. 3 illustrates a system for load balancing work items between worker threads at runtime. The system 300 includes a dispatcher 302 of a kernel, stored on a memory 304 that is coupled to a plurality of processors 306, and that performs load balancing in parallel to a kernel scheduler 309 in order to further prevent performance scaling of any of the plurality of processors 306 on a CPU 316. While the kernel scheduler 309 is limited to moving worker threads 308, 310, 312 between the plurality of processors 306, the dispatcher 302 can schedule work items to move between worker threads 308, 310, 312. The plurality of processors 306 each have a default worker thread 308, 310, 312, and one or more additional worker threads per processor.

Work items can be generated via a variety of means including kernel device drivers (as well as other bottom half processes). The illustrated embodiment shows one optional source of work items: hardware interrupts. However, in other embodiments, any bottom half can generate work items (e.g., softirqs, tasklets), where a bottom half includes any component that performs interrupt-related work not performed by the interrupt handler. In this optional embodiment, at least one hardware device 350, such as a touch screen, an accelerometer, or a gyroscope can generate interrupts that are handled by an interrupt controller 314. The interrupt controller 314 can be coupled between the at least one hardware device 350 and the plurality of processors 306, and can be configured to manage interrupts from the at least one hardware device 350. The interrupt controller 314 addresses interrupts in a top half, for instance, via an interrupt service routine (ISR), and then schedules deferrable aspects of interrupts as work items in a work queue 318, which is managed by both the kernel scheduler 309 and the dispatcher 302.

The plurality of processors 306 can receive a request to process a deferrable work item, for instance form the interrupt controller 314, and the kernel scheduler 309 can be executable on the plurality of processors 306 to schedule the deferrable work item to run on one of the processors 306 via a default worker thread 311 of one of the processors 306.

The number of processors and worker threads may vary from situation to situation, so the illustrated example includes at least three worker threads 308, 310, 312 (worker threads 1-3) and up to "n" worker threads. In the first default worker thread 308 one can see that five work items are scheduled to this worker thread 308, where four of them have first through fourth workloads or runtimes (e.g., a low workloads or runtimes), while work item 318a has a fifth workload or runtime larger than the first through fourth workloads. The cumulative effect of these five work items is a workload or runtime on the processor 1 that exceeds an illustrative runtime/workload threshold 320. The dispatcher 302 can be executable on the plurality of processors 306 to retrieve a workload history for the deferrable work item 318a. It can then generate a predicated workload that the deferrable work item 318a is likely to place on the one of the plurality of processors 306 (processor 1) that the default worker thread 311 is scheduled to execute on based on its workload history. A workload for the remaining work items scheduled to process on the default worker thread 311 can also be determined (e.g., via a workload or million instructions per second (MIPS) history for each other work item scheduled in the default worker thread 311), and a total workload for the first default worker thread 311 can be determined via these numbers and the predicted workload for the deferrable work item 318a. For instance, when a work item runs for the first time it will not have a workload or MIPS history. However, once it runs, a unique ID can be assigned to the work item and each time that the work item runs its workload or MIPS history is updated. If this total workload is calculated to exceed a threshold that triggers performance scaling of processor 1, then the dispatcher 302 can identify a second of the plurality of worker threads 310 or 312 that the deferrable work item 318a can be moved to. In determining where the deferrable work item 318a can be moved to, the dispatcher 302 looks at workloads on other worker threads 310, 312 and predicts whether moving the deferrable work item 318a to one of these other worker threads 310, 312 will trigger performance scaling on processors 306 that those worker threads 310, 312 are queued to run on. In the illustrated embodiment, one can see that the deferrable work item 318a could be moved to either the second or third worker threads 310, 312 without the total workloads/runtimes for those worker threads 310, 312 exceeding the runtime/workload threshold 320.

Once another worker thread 310, 312 has been identified that can take the deferrable work item 318a without triggering performance scaling, the dispatcher 302 can move the deferrable work item 318a from the first default worker thread 311 to whichever of the other worker threads 310, 312 is identified as being able to handle the deferrable work item 318a. In the illustrated embodiment, the dispatcher 302 moves the deferrable work item 318a to the second worker thread 310, and one can see that the total workload/runtime for the second worker thread 310 with the deferrable work item 318b does not exceed the runtime/workload threshold 320, so performance scaling will not be triggered by the move.

In the illustrated embodiment, the second and third worker threads 310, 312 are lightly-loaded and thus either of these can take on the load from the deferrable work item 318a 318a when it is moved. However, in other instances (not illustrated), one or more of the other worker threads 310, 312 may also be heavily-loaded, and thus the dispatcher 302 may have a more limited selection of worker threads 310, 312 to move the deferrable work item 318a to.

One of skill in the art will appreciate that while only a single deferrable work item has so far been discussed, in practice, the dispatcher 302 is likely to be dealing with many deferrable work items and having to juggle the movement of many deferrable work items at the same time. Additionally, while only a single worker thread per processor is shown, in practice multiple worker threads per processor may be seen. Thus, the logic used to determine where a deferrable work items is moved to will be more complex than that so far discussed.

In some cases, the deferrable work item 318a may have an affinity for one of the processors 306, meaning that there is no option to load balance or move the deferrable work item 318a to a worker thread 308, 310, 312 of another one of the processors 306. When the dispatcher 302 encounters such a deferrable work item that is wishes to move, then instead of the dispatcher 302 performing load balancing, the dispatcher 302 can at least pull the kernel scheduler 309 out of sleep before the kernel scheduler's 309 scheduled wake time. For instance, the kernel scheduler 309 may be scheduled to awaken periodically in order to perform load balancing by moving worker threads 308, 310, 312 between processors 306. Where the dispatcher 302 addresses a deferrable work item having an affinity for one of the processors 306, the dispatcher 302 can instruct or trigger the kernel scheduler 309 to wake earlier than a next wake point, and perform load balancing earlier than it otherwise would.

Some deferrable work items can be more quickly processed than others or have some priority for being processed earlier than others. In such cases, the mechanisms described above for load balancing the deferrable work item can be implemented. Yet, other deferrable work items may have less priority and/or may take longer to process or be specified to process by a certain time that is not immediate. In these cases, the dispatcher 302 can further look for worker threads 310, 312 to move the deferrable work item 318a to that have an expiration that is at or later than an expiration or time to process of the deferrable work item 318a. In other words, even though work items are deferrable, they are not indefinitely deferrable. Worker threads similarly have an expiration. Where a deferrable work item does not require immediate processing, power savings can be achieved by scheduling the deferrable work item to a worker thread that can sleep for some time before processing the deferrable work item. Therefore, matching a deferrable work item with a worker thread having a similar expiration, enables the worker thread to sleep and thus conserve system resources (e.g., power). Accordingly, where possible, the dispatcher 302 moves the deferrable work item 318a to a worker thread 310, 312 that has a similar expiration to the deferrable work item 318a.

In an embodiment, a unique identification can be associated with each deferrable work item, and the dispatcher 302 can use the unique identification to determine if an incoming deferrable work item has been seen before and to identify a MIPS consumption history for each deferrable work item that has been seen before. In particular, the dispatcher 302 may be configured to determine if a unique identification is stored in the memory 304 and associated with a given deferrable work item. If not, then the dispatcher 302 can create a unique identification, associate it with the deferrable work item, and store the unique identification in the memory 304. If a unique identification is found in the memory 304, then a mapping between the unique identification and a MIPS consumption history in the memory 304 can be used to access the MIPS consumption history for the deferrable work item. The MIPS consumption history can then be used to predict whether a deferrable work item will overload the worker thread that it is scheduled to run on, and can be used to determine what other worker thread the deferrable work item can be moved to without triggering performance scaling. For instance, the MIPS consumption history can be used to predict whether moving the deferrable work item to a second worker thread will cause the processor that the second worker thread is running on to see frequency scaling or a move to a performance cluster.

Those of skill in the art are well aware that work items in the prior art are either queued to a default worker thread without the ability to leave that thread after queuing or create their own new worker thread at runtime. However, this disclosure overcomes challenges in the art via addition of a dispatcher 302 that is able to reschedule queued deferrable work items. In other words, the dispatcher 302 can reschedule deferrable work items to a second worker thread different than an initial or default worker thread that the deferrable work item was queued to run on.

Figure 4:
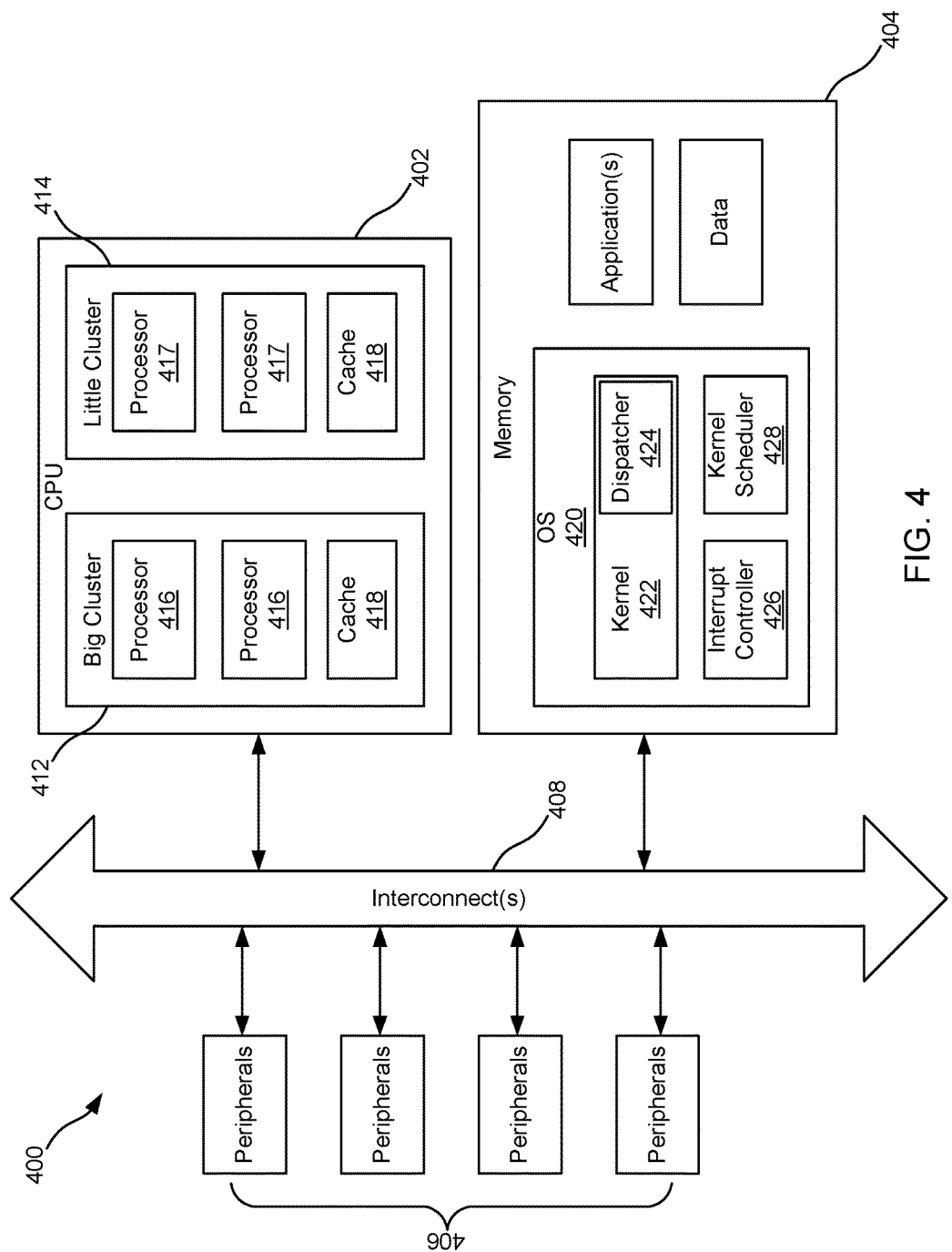
FIG. 4 illustrates another embodiment of a system for load balancing deferrable work items at runtime.

FIG. 4 illustrates another embodiment of a system for load balancing deferrable work items at runtime. The system 400 includes a CPU 402, a memory 404, at least one peripheral 406, and one or more interconnects or buses 408 coupling these various components to each other. The components on the memory 404 can be executable on the CPU 402 to carry out the runtime load balancing of work items between worker threads disclosed throughout this disclosure. The CPU 402 can be arranged as a Big-Little architecture, wherein multiple processors 410 are arranged into clusters based on performance. For instance, in the illustrated embodiment there is a big cluster 412, and a little cluster 414. The big cluster 412 can include processors 416 structured for performance, while the little cluster 414 can include processors 417 structured for power savings. Each cluster can also include one or more caches 418.

The memory 404 can include an OS 420 including a kernel 422, and a dispatcher 424 of the kernel. The dispatcher 424 can be stored on the memory 404 and can be executable on the CPU 402 to perform runtime load balancing of deferrable work items between worker threads. The OS 420 can also include an interrupt controller 426 and a kernel scheduler 428. The interrupt controller 426 can be executable on the CPU 402 to receive interrupts from the one or more peripherals 406 and to process these interrupts via one or more interrupt service routines (ISR). The kernel scheduler 428 can be executable on the CPU 402 to perform load balancing by moving worker threads between the processors 416 and 417. This load balancing can be periodically performed such that the kernel scheduler 428 can sleep between load balancing operations. However, the dispatcher 424 has the ability to trigger the kernel scheduler 428 to perform load balancing at times other than its scheduled periodic times. For instance, where a deferrable work item has an affinity for a particular processor 416, 417, the dispatcher 424 may not be able to move the deferrable work item between threads, but can at least force or trigger the kernel scheduler 428 to immediately perform load balancing.

A deferrable work item can be generated by the peripherals 406 and passed to the CPU 402 for processing. The kernel scheduler 428 can determine which of a plurality of worker threads the work item is scheduled to, where each processor 416 in the little cluster 414 has at least one worker thread. The kernel scheduler 428 can move worker threads between the processors 416 but cannot move work items once scheduled to a worker thread. The dispatcher 424 can be executable on the CPU 402, and in contrast to the kernel scheduler 428, is able to move the deferrable work item between worker threads. In particular, the dispatcher 424 can be executable to generate a predicted workload that a deferrable work item is likely to place on a default worker thread, where the default worker thread has been scheduled to execute on one of the processors 416 in the little cluster 414. The predicted workload can be based on a workload history associated with the work item, where the deferrable work item can be mapped to the workload history (e.g., MIPS history) via a unique identification stored in the memory 404. The dispatcher can add the predicted workload for the deferrable work item to a workload for all other work items scheduled to the default worker thread to form a total workload on the default worker thread. The dispatcher 424 may determine the workload for all other work items based on a workload history for each of those work items (e.g., a MIPS history for each of those work items). Both the predicted workload for the deferrable work item and the workload for all other work items are predictions based on workload histories, and in one embodiment, the total workload is calculated by adding the predicted workloads for all work items in a worker thread based on workload histories for each work item. The dispatcher 424 can also determine if the predicted workload on the default worker thread exceeds a threshold that would trigger performance scaling, where performance scaling can include increase processor 416 frequency, and/or a move of the default worker thread to a processor 416 in the big cluster 412. If the dispatcher 424 determines that the threshold would be exceeded, then the dispatcher 424 can move the deferrable work item to a second worker thread, the second worker thread scheduled to execute or run on a second of the plurality of processors 417 in the little cluster 414.

Other aspects of the system 400 that can be implemented, but that are not shown for simplicity, include the following: a graphics processing unit, peripheral interconnects, display and vide-sub systems, a memory controller, a network interface, a battery, and a power supply, to name a few non-limiting examples.

Figure 5:
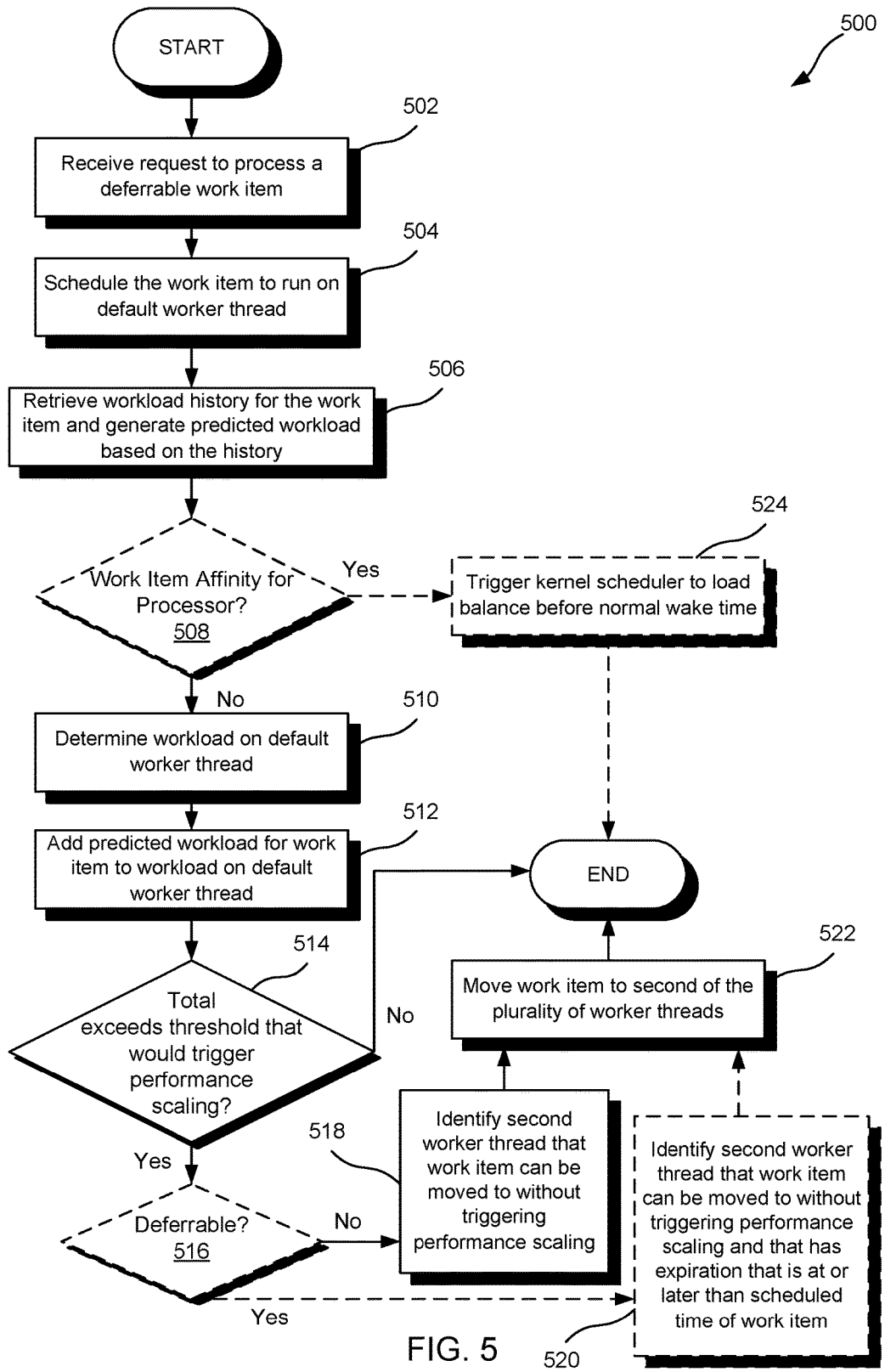
FIG. 5 illustrates a method for load balancing deferrable work items between worker threads at runtime.

FIG. 5 illustrates a method for load balancing deferrable work items between worker threads at runtime. The method 500 includes receiving a request to process a deferrable work item (Block 502). This request can be received by a plurality of processors, such as processors 306 or processors 417. The method 500 can also include scheduling the deferrable work item to run on a default worker thread (Block 504). A kernel scheduler, such as kernel scheduler 309 or kernel scheduler 428 can perform this scheduling. The default worker thread 308 is an example of the default worker thread upon which the deferrable work item (e.g., 318a) can be scheduled to run on. The method 500 can also include retrieving a workload or runtime history for the deferrable work item, and generating a predicted workload, or predicted runtime, for the deferrable work item based on the workload or runtime history (Block 506). For instance, a MIPS history for the deferrable work item can be retrieved. Optionally, the workload or runtime history can be retrieved via reference to a unique identification associated with the deferrable work item. Where no unique identification is associated with the deferrable work item, then this may indicate that the deferrable work item has not previously been processed, and a unique identification can be assigned to this new deferrable work item. The workload or runtime history and/or a mapping to the unique identification can be stored in a memory, for instance the memory 304 or the memory 404.

In some cases a deferrable work item will have an affinity for one of the processors, and in this case, the dispatcher may not be able to perform load balancing (movement of work items between worker threads). However, this does not prevent the kernel scheduler from performing its version of load balancing (movement of worker threads between processors). Thus, where a deferrable work item has an affinity for a processor (optional Decision 508), the method 500 can optionally trigger the kernel scheduler to wake from sleep before its scheduled wake time (Block 524), thus initiating the kernel scheduler's load balancing before a scheduled load balancing is scheduled to occur (e.g., re-evaluating a load across the plurality of processors and re-distributing worker threads among the plurality of processors). Once this optional triggering (Block 524) has occurred, the method 500 ends, or can repeat with Block 502.

Where the deferrable work item does not have an affinity for a processor (optional Decision 508), or where affinity is otherwise not a concern, a workload on the default worker thread can be determined (Block 510). This can involve assessing the workload or predicted workload on the default worker thread for all other work items scheduled to execute on the default worker thread. For instance, in the default worker thread 308 in FIG. 3, Block 510 can determine the workload associated with the four small work items while Block 506 can determine a workload associated with the work item 318a. It should be noted, that Block 506 can operate before or after analysis of the affinity of the work item (optional Decision 508). Alternatively, Block 510 can operate before the optional affinity analysis (optional Decision 508). Block 510 can look at a MIPS history of each work item to determine a load that each work item will contribute to the default worker thread.

Given the predicted workload for the work item, and the workload associated with all other work items scheduled on the same default worker thread, the method can then add these workloads to determine a total workload on the default worker thread (Block 512). Said another way, the combination of Block 506 and 510 can be summarized as retrieving a workload history (e.g., a MIPS history) for each work item scheduled to execute on the default worker thread, and adding these workloads for all work items scheduled to execute on the default worker thread to form a total workload on the default worker thread.

If this total does not exceed a threshold that triggers performance scaling (e.g., runtime/workload threshold 320 in FIG. 3) of the processor that the default worker thread is scheduled to execute on (Decision 514), then the deferrable work item can be left to execute on the default worker thread and the method 500 can end or return to Block 502. Alternatively, if this total workload exceeds the threshold that triggers performance scaling of the processor that the default worker thread is scheduled to execute on (Decision 514), then the method 500 can identify a second of the plurality of worker threads that the deferrable work item can be moved to (Block 518). In determining where the deferrable work item can be moved to, the method 500 can look at workloads on other worker threads and can predict whether moving the deferrable work item to one of these other worker threads will trigger performance scaling on any of the processors that those worker threads are queued to run on.

It should be noted that this is different than the load balancing performed by a kernel scheduler: a kernel scheduler moves worker threads between processors, but here a dispatcher moves work items between worker threads. This offers a more granular or finer-grained approach to load balancing than is available via the traditional kernel scheduler. It should also be noted that while the method 500 discusses movement of a single work item between worker threads, in practice, a dispatcher or other load balancing component, will likely consider movement of multiple work items between multiple worker threads.

In some cases, there may be some prioritization between work items, and/or some work items may be more quickly processed than others, and these factors can go into the decision as to which worker thread to move a work item to. Accordingly, the method 500 optionally determines if a deferrable work item has been scheduled to execute immediately or at some future/later time (Decision 516). If the deferrable work item is scheduled to execute immediately, then the method 500 continues with Block 518 as described above. However, where the deferrable work item does not need immediate processing (Decision 516), for instance an expiration has been assigned to the deferrable work item such that it only need be executed within a certain finite period of time, then a further criterion for identification of the second worker thread to move the deferrable work item to can also consider an expiration of the second worker thread (Block 520). In other words, in addition to considering whether the move to the second worker thread will trigger performance scaling of the processor on which the second worker thread is scheduled to execute on, the method 500 can also consider whether the second worker thread has an expiration that is the same or later than a certain time by when the deferrable work item needs to be executed (Block 520). More specifically, when deferrable work items are scheduled, an optional parameter can indicate whether processing of the deferrable work item is to happen immediately or after a defined or certain time. If a deferrable work item is to be processed after a defined or certain time (Decision 516=Yes), then Block 520 also considers which of the other worker threads can accommodate the delay in processing of the work item (i.e., is the deferrable work item's expiration at or later than a scheduled time for the work item to be processed).

In some instances a new worker thread can be created and the deferrable work item can be moved to the new worker thread rather than moved to an existing worker thread. This instance may be useful where all existing worker threads are already heavily-loaded, and thus movement of a deferrable work item from a default worker thread to a second worker thread would merely shift performance scaling of the default worker thread to the second worker thread—effectively negating any benefits of inter-thread load balancing.

Once the second of the plurality of worker threads is identified, the method 500 can move the deferrable work item from the default worker thread to the second worker thread (Block 522) (whichever of the other worker threads is identified as being able to handle the deferrable work item). This move can be carried out via a dispatcher, for instance, the dispatcher 302 in FIG. 3 or the dispatcher 424 in FIG. 4. After the move, the method 500 can either end or repeat at Block 502.

Figure 7:
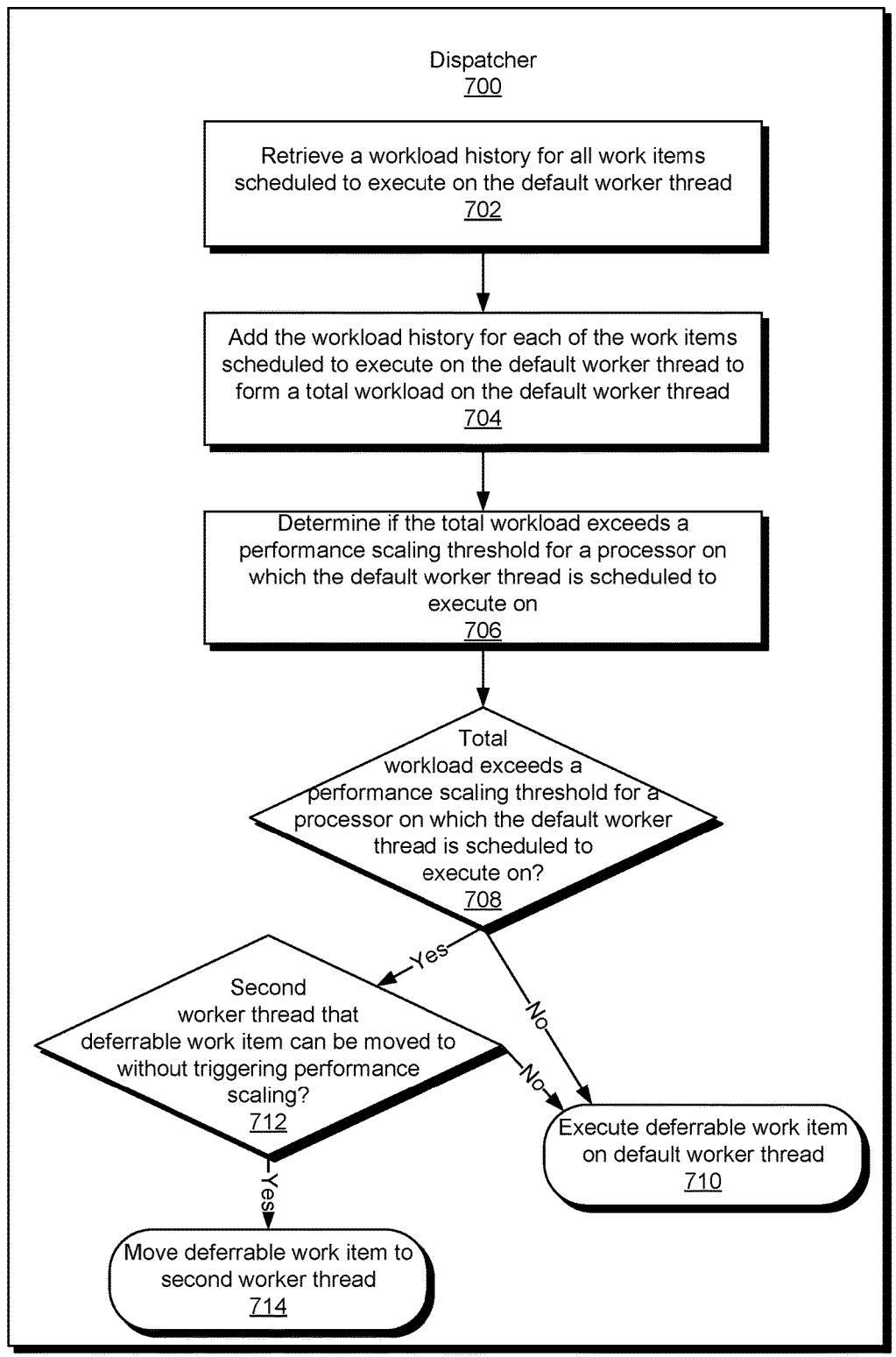
FIG. 7 illustrates an embodiment of a dispatcher component.

FIG. 7 illustrates functional aspects of a dispatcher for load balancing deferrable work items between worker threads at runtime. The dispatcher 700 can retrieve a workload history for all work items scheduled to execute on a default worker thread (Block 702). The dispatcher 700 can also add the workload history for each of the work items scheduled to execute on the default worker thread to form a total workload on the default worker thread (Block 704). This operation is another way of saying that a workload history for a deferrable work item is added to workload histories for all other work items scheduled to execute on the default worker thread. The dispatcher 700 can then determine if the total workload exceeds a first performance scaling threshold (e.g., runtime/workload threshold 320 in FIG. 3) for a processor on which the default worker thread is scheduled to execute on (Block 706). If the first performance scaling threshold is not exceed (Decision 708), then a deferrable work item can be executed on the default worker thread (Block 710). If the first performance scaling threshold is exceeded (Decision 708), then the dispatcher 700 searches for a second worker thread that a deferrable work item can be moved to. The search can involve looking for a second worker thread that the deferrable work item can be moved to without triggering performance scaling (Decision 712). This can involve adding a workload history for all work items scheduled on the second worker thread plus the workload history for the deferrable work item to form a second total workload history. If there is a second worker thread where the second total workload history does not exceed a second performance scaling threshold for a second processor on which the second worker thread is scheduled to execute on (Decision 712), then the deferrable work item can be moved to the second worker thread (Block 714). In other words, moving the deferrable work item (Block 708) includes searching for a second worker thread that has a sufficiently low workload that adding the deferrable work item to this second worker thread will not adversely affect performance and power consumption associated with the second worker thread. In some cases there may be multiple worker threads that meet this criterion, and the deferrable work item can be moved to a one of these other worker threads that is most lightly loaded. In other cases, there may not be a second worker thread that meets this criterion (Decision 712), in which case, the dispatcher 700 may opt to not move the deferrable work item from the default worker thread and stick with execution of the deferrable work item on the default worker thread (Block 710).

To summarize, this disclosure presents a novel dispatcher and methods of load balancing that reschedule or move deferrable work items between worker threads after a kernel scheduler has scheduled deferrable work items to worker threads based on (1) a MIPS history for deferrable work items, (2) a processor affinity of deferrable work items, and (3) a deferability of deferrable work items.

Even where developers create their own work queues, and thus their own worker threads, work items still tend to be queued to the same worker threads and place an undue load on a given worker thread. Therefore, this disclosure is applicable to any overloaded worker thread, not just "default worker threads."

Figure 6:
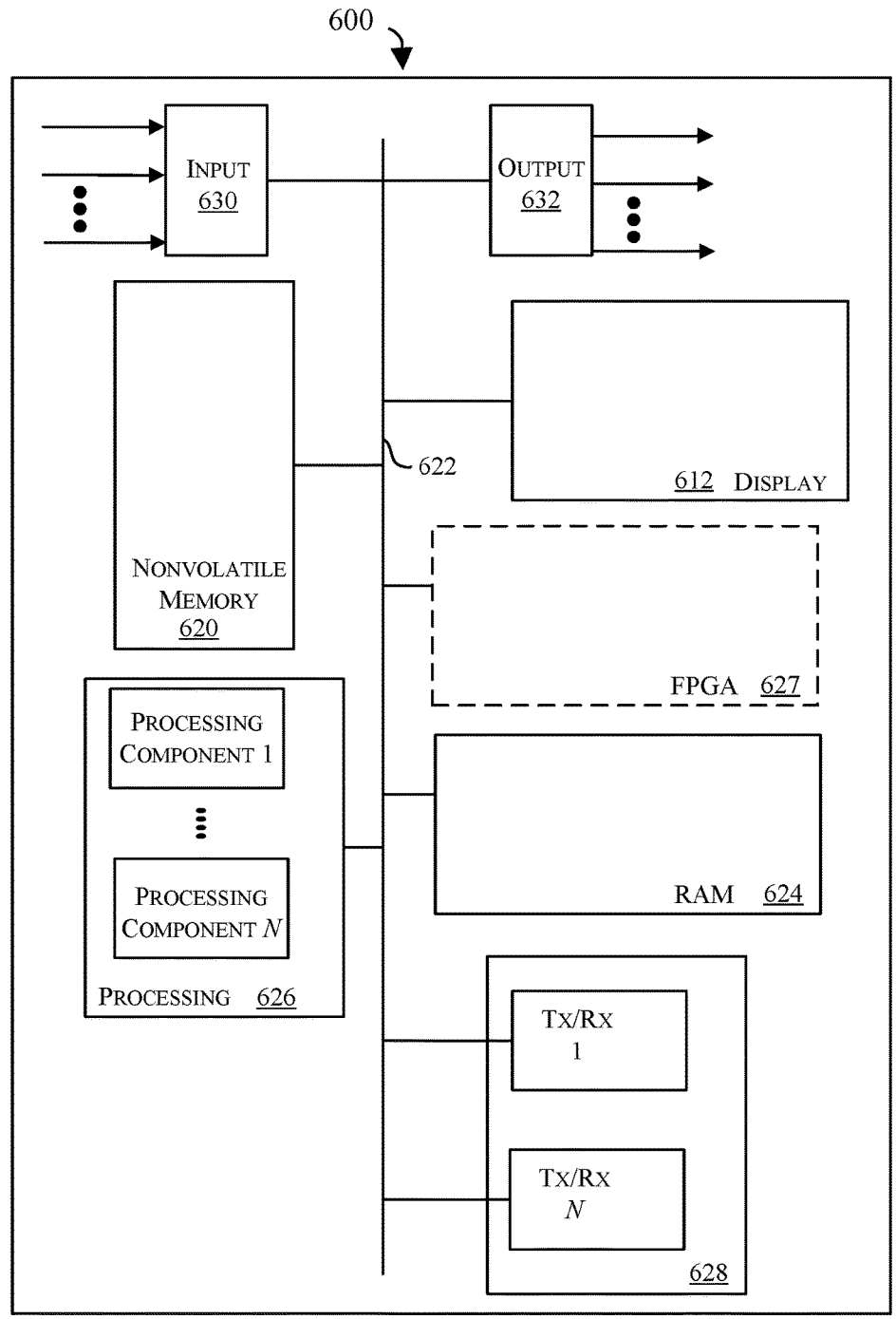
FIG. 6 illustrates a diagrammatic representation of one embodiment of a computer system for load balancing deferrable work items at runtime.

The methods described in connection with the embodiments disclosed herein may be embodied directly in hardware, in processor-executable code encoded in a non-transitory tangible processor readable storage medium, or in a combination of the two. Referring to FIG. 6 for example, shown is a block diagram depicting physical components that may be utilized to realize the computing devices having the CPU 316 and CPU 402 (and the processors 306, 416, and 417 generally) according to an exemplary embodiment. As shown, in this embodiment a display portion 612 and nonvolatile memory 620 are coupled to a bus 622 that is also coupled to random access memory ("RAM") 624, a processing portion (which includes N processing components) 626, an optional field programmable gate array (FPGA) 627, and a transceiver component 628 that includes N transceivers. Although the components depicted in FIG. 6 represent physical components, FIG. 6 is not intended to be a detailed hardware diagram; thus many of the components depicted in FIG. 6 may be realized by common constructs or distributed among additional physical components. Moreover, it is contemplated that other existing and yet-to-be developed physical components and architectures may be utilized to implement the functional components described with reference to FIG. 6.

This display portion 612 generally operates to provide a user interface for a user, and in several implementations, the display is realized by a touchscreen display. In general, the nonvolatile memory 620 is non-transitory memory that functions to store (e.g., persistently store) data and processor-executable code (including executable code that is associated with effectuating the methods described herein). In some embodiments for example, the nonvolatile memory 620 includes bootloader code, operating system code, file system code, and non-transitory processor-executable code to facilitate the execution of a method described with reference to FIG. 5 described further herein.

In many implementations, the nonvolatile memory 620 is realized by flash memory (e.g., NAND or ONENAND memory), but it is contemplated that other memory types may be utilized as well. Although it may be possible to execute the code from the nonvolatile memory 620, the executable code in the nonvolatile memory is typically loaded into RAM 624 and executed by one or more of the N processing components in the processing portion 626 (e.g., CPU 316 and CPU 402).

The N processing components in connection with RAM 624 generally operate to execute the instructions stored in nonvolatile memory 620 to enable rescheduling of a deferrable work item from a default worker thread to a second worker thread. For example, non-transitory, processor-executable code to effectuate the methods described with reference to FIG. 5 may be persistently stored in nonvolatile memory 620 (e.g., memory 304 in FIG. 3 and memory 404 in FIG. 4) and executed by the N processing components (e.g., processors 306 in FIG. 3 and processors 416, 417 in FIG. 4) in connection with RAM 624. As one of ordinarily skill in the art will appreciate, the processing portion 626 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 626 may be configured to effectuate one or more aspects of the methodologies described herein (e.g., the method described with reference to FIG. 5). For example, non-transitory processor-readable instructions may be stored in the nonvolatile memory 620 or in RAM 624 and when executed on the processing portion 626, cause the processing portion 626 to perform a method for rescheduling a work item, scheduled to run on a default worker thread, to run on a second worker thread less-loaded than the default worker thread. Alternatively, non-transitory FPGA-configuration-instructions may be persistently stored in nonvolatile memory 620 and accessed by the processing portion 626 (e.g., during boot up) to configure the hardware-configurable portions of the processing portion 626 to effectuate the functions of the dispatcher 302 and dispatcher 424.

The input component 630 operates to receive signals (e.g., deferrable work items from hardware peripherals) that are indicative of data to be scheduled for processing by the kernel scheduler 309, 428 and dispatcher 302, 424. The output component generally operates to provide one or more analog or digital signals to effectuate an operational aspect of the kernel scheduler 309, 428 and dispatcher 302, 424. For example, the output portion 632 may provide scheduling instructions to the processors 306, 410 described with reference to FIGS. 3 and 4.

The depicted transceiver component 628 includes N transceiver chains, which may be used for communicating with external devices via wireless or wireline networks. Each of the N transceiver chains may represent a transceiver associated with a particular communication scheme (e.g., WiFi, Ethernet, Profibus, etc.).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An electronic device for load balancing deferrable work items between worker threads at runtime, the electronic device comprising:
a plurality of processors each scheduled to execute one default worker thread,
a scheduler executable on the plurality of processors to schedule a deferrable work item to execute on one of the default worker threads; and a dispatcher executable on one or more of the plurality of processors to:

generate a predicted workload that the deferrable work item is likely to place on the one of the plurality of processors that the one of the default worker threads is scheduled to execute on based on a workload history of the deferrable work item;

add the predicted workload for the deferrable work item to a workload on the one of the default worker threads for all other work items scheduled to execute on the one of the default worker threads, to form a total workload on the one of the default worker threads;

if the total workload exceeds a threshold that would trigger performance scaling of the one of the plurality of processors that the one of the default worker threads is scheduled to execute on, then move the deferrable work item to a second worker thread, the second worker thread running on a second of the plurality of processors; and wherein if the deferrable work item is required to run on one of the plurality of processors, then the dispatcher is unable to move the deferrable work item to the second worker thread, and instead triggers a kernel scheduler to awaken and begin load balancing before a scheduled wake time, wherein the load balancing includes re-evaluating a load across the plurality of processors and re-distributing worker threads across the plurality of processors to distribute the load.

2. The electronic device of claim 1, wherein the dispatcher further determines whether a deferrable work item has been scheduled to run immediately or after a time, and if after the time, then a further criterion for identifying the second worker thread is identifying a worker thread having an expiration that is the same or later than the time of the deferrable work item.

3. The electronic device of claim 1, wherein if a unique identification is not associated with the deferrable work item, then the dispatcher creates a unique identification, associates the unique identification with the deferrable work item, and stores the unique identification.

4. The electronic device of claim 1, wherein the move occurs at runtime of the deferrable work item.

5. The electronic device of claim 1, wherein the deferrable work item is a process triggered by an interrupt or a bottom half process.

6. A method comprising:

receiving a request from a hardware device to process a deferrable work item, the hardware device coupled to a plurality of processors;

scheduling the deferrable work item to run on a default worker thread, the default worker thread running on a first of the plurality of processors;

retrieving a workload history for the deferrable work item;

generating a predicted workload that the deferrable work item is likely to place on the first of the plurality of processors based on the workload history;

adding the predicted workload for the deferrable work item to a workload for all other work items scheduled to execute on the default worker thread to form a total workload on the default worker thread;

if the total workload on the default worker thread exceeds a performance scaling threshold, then moving the deferrable work item to a second worker thread, the second worker thread running on a second of the plurality of processors;

identifying one of a plurality of worker threads as the second worker thread if the deferrable work item can be moved to the second worker thread without triggering performance scaling of a second of the plurality of processors that the second worker thread is scheduled to execute on; and determining whether the deferrable work item has been scheduled to run immediately or after a time, and if after the time, then a further criteria for identifying one of the plurality of worker threads as the second worker thread is identifying a worker thread having an expiration that is the same or later than the time of the deferrable work item.

7. The method of claim 6, wherein if the deferrable work item is required to run on one of the plurality of processors, then a dispatcher is unable to move the deferrable work item to the second worker thread, and instead triggers a kernel scheduler to awaken and begin load balancing before a scheduled wake time, wherein the load balancing includes re-evaluating a load across the plurality of processors and re-distributing worker threads across the plurality of processors to distribute the load.

8. The method of claim 6, wherein the deferrable work item is formed by an interrupt or any other bottom half.

9. A non-transitory, tangible computer readable storage medium, encoded with processor readable instructions to perform a method for load balancing work items between worker threads at runtime, the method comprising:

scheduling a deferrable work item to run on a default worker thread, the default worker thread running on a first of a plurality of processors;

retrieving a workload history for all work items scheduled to execute on the default worker thread;

adding the workload history for each of the work items scheduled to execute on the default worker thread to form a total workload on the default worker thread; and if the total workload exceeds a performance scaling threshold for the first of the plurality of processors, then moving the deferrable work item to a second worker thread, the second worker thread running on a second of the plurality of processors; and wherein if the deferrable work item is required to run on one of the plurality of processors, then a dispatcher is unable to move the deferrable work item to the second worker thread, and instead triggers a kernel scheduler to awaken and begin load balancing before a scheduled wake time, wherein the load balancing includes re-evaluating a load across the plurality of processors and re-distributing worker threads across the plurality of processors to distribute the load.

10. The non-transitory, tangible computer readable storage medium of claim 9, further comprising identifying one of a plurality of worker threads as the second worker thread if the deferrable work item can be moved to the second worker thread without triggering performance scaling of the second of the plurality of processors that the second worker thread is scheduled to execute on.

11. The non-transitory, tangible computer readable storage medium of claim 10, further comprising determining whether the deferrable work item has been scheduled to run immediately or after a time, and if after the time, then a further criteria for identifying one of the plurality of worker threads as the second worker thread is identifying a worker thread having an expiration that is the same or later than the time of the deferrable work item.

12. The non-transitory, tangible computer readable storage medium of claim 9, wherein the deferrable work item is formed by an interrupt or any other bottom half.

13. A system for load balancing work items between worker threads at runtime, the system comprising:
  a means to execute one default worker thread,
  a means to schedule a deferrable work item to one of the default worker threads, the one of the default worker threads scheduled to execute on one of a plurality of processors; and
  a means for:
    retrieving a workload history for work items scheduled to execute on the default worker thread;
    adding the workload history for each of the work items scheduled to execute on the default worker thread to form a total workload on the default worker thread; and
    if the total workload exceeds a performance scaling threshold for the first of the plurality of processors, then
    moving the deferrable work item to a second worker thread, the second worker thread running on a second of the plurality of processors; and
    wherein if the deferrable work item is required to run on one of the plurality of processors, then a dispatcher is unable to move the deferrable work item to the second worker thread, and instead triggers a kernel scheduler to awaken and begin load balancing before a scheduled wake time, wherein the load balancing includes re-evaluating a load across the plurality of processors and re-distributing worker threads across the plurality of processors to distribute the load.

14. The system of claim 13, further comprising identifying one of a plurality of worker threads as the second worker thread if the deferrable work item can be moved to the second worker thread without triggering performance scaling of a second of the plurality of processors that the second worker thread is scheduled to execute on.

15. The system of claim 14, further comprising determining whether the deferrable work item has been scheduled to run immediately or after a time, and if after the time, then a further criteria for identifying one of the plurality of worker threads as the second worker thread is identifying a worker thread having an expiration that is the same or later than the time of the deferrable work item.

16. The system of claim 13, wherein the deferrable work item is formed by an interrupt or any other bottom half.

* * * * *